2,984,689
METHOD OF MANUFACTURING TETRANITROPROPANE

Karl Klager, Monrovia, Calif., assignor, by mesne assignments, to Aerojet-General Corporation, Cincinnati, Ohio, a corporation of Ohio No Drawing. Filed Apr. 10, 1951, Ser. No. 220,365

2 Claims. (Cl. 260—644)

This invention relates to the formation of 1,1,3,3-tetra-nitropropane and has for its object the development of a process that is simpler than existing methods and will produce better yields of this compound than have heretofore been possible.

Several methods have been employed for the formation of tetranitropropane, however, all of these methods are complicated, require considerable skill and produce low yields.

I have discovered that it is possible by my method to produce 1,1,3,3-tetranitropropane in substantial yields by a relatively simple process.

The invention is carried out by treating solutions or suspensions of salts of dinitroethanol with acids such as sulfuric acid until the pH of the solution is less than 7, preferably between 4 and 5.

The reaction takes place in the following manner:

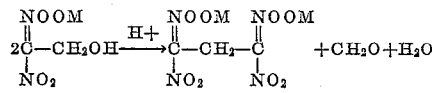

in which M may be an alkali metal such as potassium, lithium, sodium, rubidium, and caesium; an alkaline earth metal such as calcium, magnesium, strontium, barium, beryllium; or a quaternary ammonium radical such as benzyl trimethyl ammonium hydroxide.

The following process shows the manner in which 1,1,3,3-tetranitropropane may be simply prepared.

A 3-necked flask is charged with 500 ml. of water and about 200 grams of damp potassium dinitroethanol (20% moisture). Seventy-five ml. of 30% sulfuric acid is slowly added to the mixture with constant stirring and the temperature of the mixture is maintained at approximately 18° C. The pH of the mixture, after all of the sulfuric acid had been added, is about 4.2. Stirring is continued for 2.5 hours and throughout this period the temperature is maintained below 31° C., preferably between 18–21° C., by cooling the reactor with cold water. After the first 15 minutes of stirring all of the solid material becomes dissolved and on continued stirring a yellowish brown precipitate forms. After 2.5 hours the mixture is cooled to about 0° C., neutralized with an aqueous solution of a water soluble alkali metal or alkaline earth metal hydroxide in water such as, for example, a 20% solution of potassium hydroxide, and the entire mixture is made alkaline until the pH is between 9–10. The mixture is then stirred for 15 minutes longer, filtered, and the filter washed with ice water, then 50% methanol and then straight methanol. The yield obtained in this manner is 138 grams of damp potassium 1,1,3,3-tetranitropropane (20% moisture) which is the equivalent of 75% of the theoretical yield. Any other water soluble alcohol may be used in place of methanol, for example, ethanol or propanol.

An advantage of the method which I have discovered resides in the fact that the 1,1,3,3-tetranitropropane may be produced easily and in good yields without employing any complicated equipment or process; the control of the pH of the solution being the essential critical factor. 1,1,3,3-tetranitropropane is a particularly useful substance as an intermediate for the preparation of a wide variety of substances such as, for example, propellants and explosives.

I claim:

1. An improved method of forming 1,1,3,3-tetranitropropane which comprises acidifying an aqueous solution of a compound having the formula

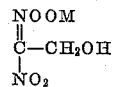

in which M is a cation selected from the group consisting of alkali metals, alkaline earth metals, and quaternary ammonium radicals until the pH is less thn 7, stirring the aqueous mixture at a temperature below 31° C. until a yellowish brown precipitate has formed and continuing stirring the mixture for a period of about two and one-half hours, cooling the mixture to approximately 0° C., neutralizing the mixture with an aqueous solution of a hydroxide selected from the group consisting of water soluble alkaline earth metal hydroxides and alkali metal hydroxides until the pH of the solution is raised to between about 9 and 10, continuing agitation of the mixture for an additional 15 minutes, filtering out the precipitate, washing the precipitate with ice water, then a 50% aqueous solution of any water soluble alcohol and then with the pure water soluble alcohol.

2. An improved method of forming 1,1,3,3-tetranitropropane which comprises acidifying an aqueous solution of a compound having the formula

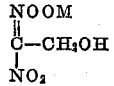

in which M is a cation selected from the group consisting of alkali metals, alkaline earth metals and quaternary ammonium radicals until the pH is less than 7, stirring the aqueous mixture at a temperature below 31° C. until a yellowish brown precipitate has formed and continuing stirring the mixture for a period of about two and one-half hours, cooling the mixture to approximately 0° C., neutralizing the mixture with a metal hydroxide selected from the group consisting of water soluble alkali metal and alkaline earth metal hydroxides until the pH of the solution is raised to between about 9 and 10, continuing agitation of the mixture for an additional 15 minutes, filtering out the precipitate, washing the precitate with ice water then with 50% methanol in water and then pure methanol.

No references cited.